(12) United States Patent
Würfel

(10) Patent No.: US 6,877,477 B2
(45) Date of Patent: Apr. 12, 2005

(54) FUEL INJECTION SYSTEM

(75) Inventor: Gernot Würfel, Vaihingen/Enz (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/332,558

(22) PCT Filed: May 8, 2002

(86) PCT No.: PCT/DE02/01660
§ 371 (c)(1),
(2), (4) Date: Sep. 8, 2003

(87) PCT Pub. No.: WO02/090763
PCT Pub. Date: Nov. 14, 2002

(65) Prior Publication Data
US 2004/0025834 A1 Feb. 12, 2004

(30) Foreign Application Priority Data
May 9, 2001 (DE) ......................... 101 22 352

(51) Int. Cl.⁷ ................................. F02B 3/00
(52) U.S. Cl. ................. 123/294; 123/299; 239/533.2
(58) Field of Search ............................ 123/294, 305, 123/299, 279, 276; 239/533.2, 533.12, 558

(56) References Cited

U.S. PATENT DOCUMENTS

| | | | | |
|---|---|---|---|---|
| 6,035,824 A | * | 3/2000 | Lee | ............... 123/295 |
| 6,345,601 B1 | * | 2/2002 | Miyajima et al. | ............ 123/305 |
| 6,510,836 B2 | * | 1/2003 | Ismailov | ................. 123/299 |
| 6,588,396 B1 | * | 7/2003 | Cleary et al. | ............... 123/276 |
| 6,644,267 B2 | * | 11/2003 | Wuerfel | ................. 123/298 |
| 6,672,276 B2 | * | 1/2004 | Hiraya et al. | ............... 123/276 |
| 6,715,463 B2 | * | 4/2004 | Kudo et al. | ................. 123/261 |

FOREIGN PATENT DOCUMENTS

| | | |
|---|---|---|
| DE | 196 42 653 | 1/1998 |
| DE | 198 04 463 | 8/1999 |
| DE | 100 26 321 | 11/2001 |
| JP | 10 008969 | 1/1998 |
| JP | 2001027170 | 1/2001 |

* cited by examiner

Primary Examiner—John T. Kwon
(74) Attorney, Agent, or Firm—Kenyon & Kenyon

(57) ABSTRACT

A fuel injection system for internal combustion engines having a fuel injector that injects fuel into a combustion chamber, which is delimited by a cylinder wall in which a piston is guided, and having a spark plug that projects into the combustion chamber, the fuel injector injecting a plurality of injection jets into the combustion chamber. The injection jets generate a cone-shaped mixture cloud having an elliptical cross-section in the combustion chamber.

7 Claims, 2 Drawing Sheets

FUEL INJECTION SYSTEM

BACKGROUND INFORMATION

In mixture-compressing internal combustion engines having external ignition and internal mixture formation, stratified charge operation requires a "mixture cloud" in the region of the spark plug, which must have a particular fuel-air ratio in the ignitable region. For this purpose, fuel injectors are used which include nozzles that open to the inside or to the outside and generate a conical jet.

From German Patent Application No. 198 04 463, a fuel injection system for a mixture-compressing internal combustion engine having external ignition is known, which includes at least one fuel injector that injects fuel into a combustion chamber having a piston/cylinder design, and which is provided with a spark plug projecting into the combustion chamber. The nozzle body of the fuel injector is provided used with at least one row of injection orifices distributed across the circumference of the nozzle body. By a selective injection of fuel via the injection orifices, a jet-controlled combustion method is realized by the formation of a mixture cloud, at least one jet being aimed in the direction of the spark plug or its immediate vicinity. Additional jets ensure that an at least approximately continuous or cohesive mixture cloud is formed.

Disadvantageous in the fuel injector known from German Patent Application No. 198 04 463 is, in particular, the incomplete utilization of the available combustion chamber, which results in a low-quality mixture formation due to an air proportion that is too high, and subsequent superelevated emissions of unburned hydrocarbons caused by individual combustion misses, as well as higher fuel consumption.

SUMMARY OF THE INVENTION

The fuel injector system according to the present invention has the advantage over the related art that, as a result of the different expansion, in a longitudinal and a transverse direction of the internal combustion engine, of the mixture cloud injected into the combustion chamber, and as a result of the elliptical cross-sectional form of the mixture cloud resulting therefrom, the mixture cloud is able to be more optimally adapted to the shape of the combustion chamber, thereby allowing more effective combustion, lower fuel consumption and reduced pollutant emission.

It is particularly advantageous that the thermal shock load and the carbon-fouling of the spark plug are able to be reduced by the tangential injection of fuel relative to the spark-plug position, since the injection jets are not aimed directly at the spark plug.

By a selective configuration of the spray-discharge orifices and, thus, the injection jets in the combustion chamber, the installation position of the intake and discharge valves as well as the spark plug in the cylinder head may be advantageously taken into account, even though the combustion-chamber geometry is still able to be optimally utilized.

The fuel injectors suited for the fuel injection system may be advantageously produced in a cost-effective manner, without additional production effort.

DETAILED DESCRIPTION

Figure 1:
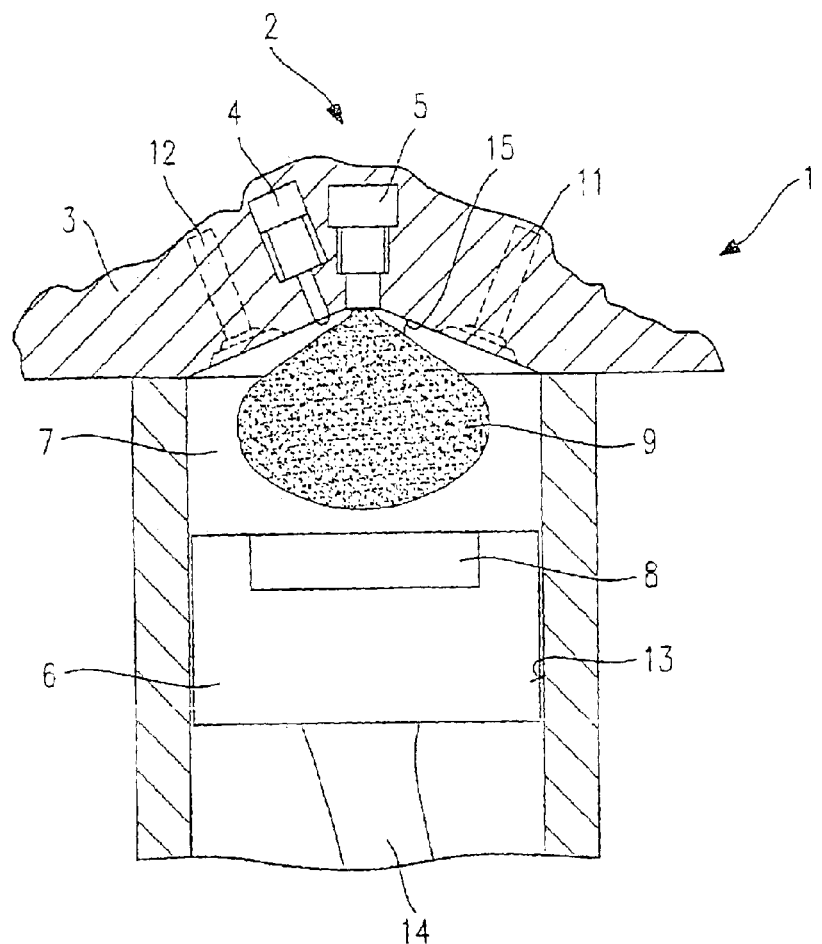
FIG. 1 shows a schematic section through an exemplary embodiment of an internal combustion engine having a fuel injection system configured according to the present invention.

In a part-sectional view, FIG. 1 shows an exemplary embodiment of an internal combustion engine 1 having a fuel injection system 2 according to the present invention.

Fuel injection system 2 includes a cylinder block having a cylinder wall 13, in which a piston 6 is guided. A connecting rod 14 guides piston 6 in its up-and-down movement along cylinder wall 13. A cylinder head 3 seals off cylinder wall 13 at its extremity. Cylinder wall 13, piston 6 and cylinder head 3 enclose a combustion chamber 7.

A fuel injector 5 is positioned in cylinder head 3, preferably in its center. A spark plug 4 is inserted in a bore of cylinder head 3 at a slight lateral offset. Moreover, at least one intake valve 11 and at least one discharge valve 12 are present.

When fuel injection system 2 is in operation, injection jets (sprays) 10, which together form a cone-shaped fuel jet, are injected into combustion chamber 7 through spray-discharge openings present in fuel injector 5. A mixture cloud 9 is formed by mixing fuel and air in combustion chamber 7. Mixture cloud 9 is ignited by spark plug 8. The shape of the cone-shaped fuel jet according to the present invention is explained in greater detail with the aid of FIGS. 2 and 3.

It can be inferred from FIG. 1 that combustion chamber 7 of internal combustion engine 1 is designed in the form of a roof-shaped combustion chamber 7 in cylinder head 3, which includes ridge slopes 15 and a ridge 16. Fuel injector 5 is located at ridge 16, whereas gas-exchange valves 11 and 12 are located in ridge slopes 15. This is particularly advantageous when more than two gas exchange valves 11, 12 are used, since internal combustion engine 1 is more optimally supplied with air in this manner when operated at full load.

In order to be able to utilize combustion chamber 7 in an optimal manner and take the position of intake and discharge valves 11, 12 into account, the present invention provides for fuel injector 5 to be designed in such a way that injection jets 10, injected into combustion chamber 7 by fuel injector 5, are injected at an angle that is greater in a longitudinal direction of internal combustion engine 1 than in a transverse direction of internal combustion engine 1.

Figure 2A:
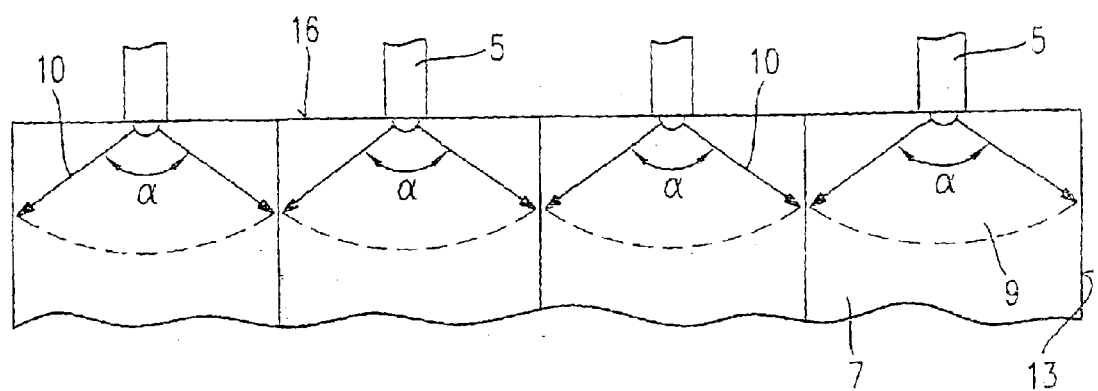
FIGS. 2A and 2B show a schematic section, in a longitudinal direction and in a transverse direction, through the internal combustion engine and the fuel injection system according to the present invention.
Figure 2B:
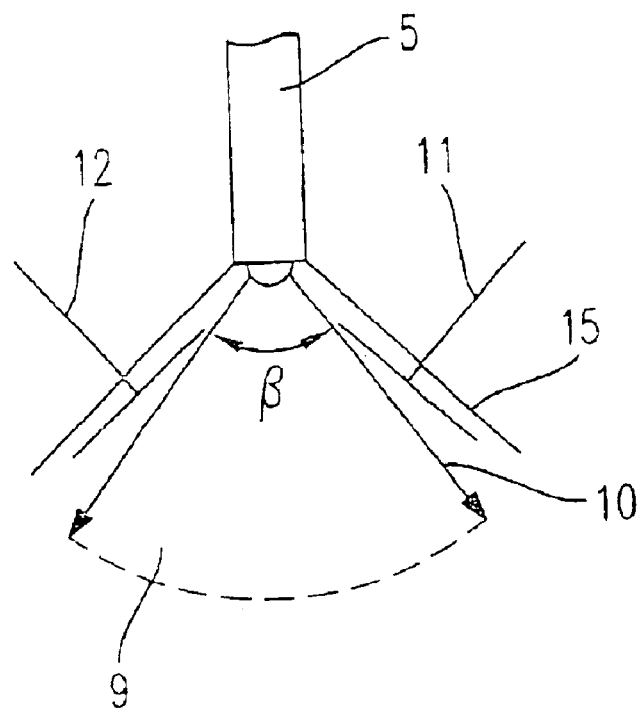

To illustrate this measure, FIG. 2A shows a heavily schematized longitudinal section through an exemplary internal combustion engine 1 having four cylinders, while FIG. 2B shows a section through one of the cylinders in a transverse direction of internal combustion engine 1.

As can be inferred from FIG. 2A, injection jets 10 are injected with the aid of fuel injector 5 under a maximum opening angle $\alpha$, which is determined by the position of the spray-discharge orifices of fuel injector 5.

In a transverse direction of internal combustion engine 1, injection jets 10, as shown in FIG. 2B, are injected in accordance with ridge slopes 15, which delimit combustion chamber 7, at an angle $\beta$, which is smaller than angle $\alpha$. Gas-exchange valves 11 and 12 and also spark plug 4 (not shown in FIG. 2B), thus, are only tangentially grazed by injection jets 10 and are not directly exposed to injection jet 10. This is advantageous in particular in the case of spark plug 4, since the thermal shock load and deposit formation on the electrodes are reduced in this manner and the service life of spark plug 4 is extended.

A view of a section through injected mixture cloud 9 shows the elliptical form, which is due to the sizes of opening angles α and β differing from each other in two orthogonal spatial directions. Because of the lateral flattening of mixture cloud 9, it is optimally adapted to the shape of combustion chamber 7.

Figure 3:
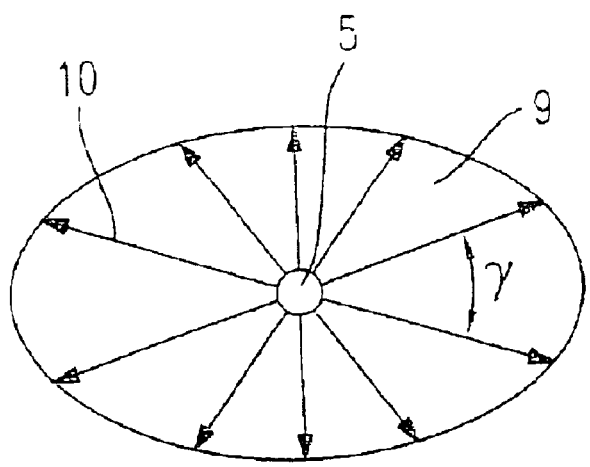
FIG. 3 shows a schematic section through a mixture cloud generated in a combustion chamber of the internal combustion engine.

The jet angles that are between the maximum opening angle α and the minimum opening angle β may then be continually approximated to the extreme values by using an arbitrary number of individual injection jets 10. FIG. 3 shows, by way of example, a mixture cloud 9 made up of ten individual injection jets 10. Maximum opening angle α is not assumed, but merely approximated by two adjacently located injection jets 10. Such a configuration may be advantageous, for instance, when two spark plugs 4 are provided, which should not be exposed to a direct injection so as to avoid the stress of thermal shock, spark plugs 4 being disposed in the sides of the roof ridge.

If spark plug 4 is located in the "roof ridge", for example, minimum opening angle β is not assumed, but likewise approximated by two adjacently located injection jets.

By using any desired number of spray-discharge orifices of fuel injector 5, virtually any configuration of injection jets 10 may be generated. Jet clearance angle Y of individual injection jets 10 may be identical or differ with respect to one another. The configuration of jet clearance angles Y is independent of the configuration of opening angles α and β of mixture cloud 9.

The present invention is not restricted to the exemplary embodiment shown and, for instance, is also applicable to fuel injection systems 2 that have more or fewer injection jets 10, gas-exchange valves 11, 12 and, in particular, a plurality of spark plugs 4 as well as variable displacement volumes.

What is claimed is:

1. A fuel injection system system for an internal combustion engine, the engine including a combustion chamber which is delimited by a cylinder wall in which a piston is guided, the fuel injection system comprising:

a spark plug that projects into the combustion chamber; and at least one fuel injector that injects fuel into the combustion chamber, the fuel injector injecting a plurality of injection jets into the combustion chamber, the injection jets generating a cone-shaped mixture cloud in the combustion chamber, the mixture cloud having an elliptical cross section;

wherein the mixture cloud has a first opening angle in a longitudinal direction of the engine, the mixture cloud having a second opening angle in a transverse direction of the engine, the first opening angle being greater than the second opening angle.

2. The fuel injection system according to claim 1, wherein injection jets lying between injection jets that are injected at the first and second opening angles, continuously approach the first and second opening angles.

3. The fuel injection system according to claim 1, wherein the second opening angle is a minimum opening angle aligned along ridge slopes.

4. The fuel injection system according to claim 1, wherein the fuel injector is situated at a ridge, delimited by ridge slopes, of a cylinder head.

5. The fuel injection system according to claim 1, wherein jet clearance angles between individual ones of the injection jets are of equal size.

6. The fuel injection system according to claim 1, wherein jet clearance angles between individual ones of the injection jets are of different sizes.

7. The fuel injection system according to claim 1, wherein the injection jets are aligned in such a way that they are tangentially aligned to the spark plug and gas-exchange valves situated in a cylinder head of the engine.

\* \* \* \* \*